United States Patent
Ogawa et al.

(10) Patent No.: US 9,573,445 B2
(45) Date of Patent: Feb. 21, 2017

(54) VEHICLE DOOR STRUCTURE

(71) Applicant: TOYOTA JIDOSHA KABUSHIKI KAISHA, Toyota-shi, Aichi (JP)

(72) Inventors: Satoshi Ogawa, Toyota (JP); Atsushi Mikuni, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/906,721

(22) PCT Filed: Jun. 10, 2014

(86) PCT No.: PCT/JP2014/065829
§ 371 (c)(1),
(2) Date: Jan. 21, 2016

(87) PCT Pub. No.: WO2015/015930
PCT Pub. Date: Feb. 5, 2015

(65) Prior Publication Data
US 2016/0159207 A1 Jun. 9, 2016

(30) Foreign Application Priority Data

Jul. 30, 2013 (JP) .................................. 2013-157736

(51) Int. Cl.
*B60J 5/04* (2006.01)
(52) U.S. Cl.
CPC ............. *B60J 5/0463* (2013.01); *B60J 5/0427* (2013.01); *B60J 5/0431* (2013.01); *B60J 5/0437* (2013.01); *B60J 5/0445* (2013.01); *B60J 5/0481* (2013.01); *B60J 5/0484* (2013.01)

(58) Field of Classification Search
CPC ........ B60J 5/0463; B60J 5/0427; B60J 5/0481
USPC .......................... 49/502; 296/146.6, 146.11
See application file for complete search history.

(56) References Cited

U.S. PATENT DOCUMENTS

| 5,599,057 A * | 2/1997 | Hirahara | ................ B60J 5/0437 296/146.6 |
| 6,053,565 A * | 4/2000 | Cho | ....................... B60J 5/0459 296/146.6 |
| 8,042,860 B2 * | 10/2011 | Takahashi | .............. B60J 5/0426 296/146.6 |

(Continued)

FOREIGN PATENT DOCUMENTS

| DE | 19936175 A1 | 2/2001 |
| EP | 2199128 A1 | 6/2010 |

(Continued)

*Primary Examiner* — Jerry Redman
(74) *Attorney, Agent, or Firm* — Andrews Kurth Kenyon LLP

(57) ABSTRACT

A vehicle door structure has: a door inner panel that is made of resin and that, together with a door outer panel, structures a door main body portion having a substantially closed cross-sectional shape; a beam having a main body portion, that extends in a door longitudinal direction, and an extended portion that is made of metal and is provided in continuation with a length direction end portion of the main body portion, the beam being disposed within the closed cross-section of the door main body portion; and a bent portion that is bendingly formed at the extended portion, and that, as seen in plan view, is disposed further toward a door thickness direction outer side than the frame main body portion.

3 Claims, 7 Drawing Sheets

(56) References Cited

U.S. PATENT DOCUMENTS

| | | | | |
|---|---|---|---|---|
| 2002/0093219 A1* | 7/2002 | Traister | ............... | B60J 5/0433 296/146.6 |
| 2005/0017538 A1* | 1/2005 | Omori | ............... | B60J 5/0411 296/146.6 |
| 2005/0121941 A1* | 6/2005 | Omori | ............... | B60J 5/0431 296/146.6 |
| 2010/0301630 A1* | 12/2010 | Ohta | ............... | B60J 5/0431 296/146.6 |
| 2014/0191535 A1* | 7/2014 | Sugiyama | ............... | B62D 25/16 296/193.05 |
| 2014/0375078 A1* | 12/2014 | Fujihara | ............... | B60J 5/0443 296/146.6 |
| 2015/0246596 A1* | 9/2015 | Kajigai | ............... | B60J 5/0431 296/146.6 |

FOREIGN PATENT DOCUMENTS

| | | |
|---|---|---|
| JP | S63-46923 A | 2/1988 |
| JP | 2003-205745 A | 7/2003 |
| JP | 2004-338569 A | 12/2004 |
| JP | 2006-044530 A | 2/2006 |
| JP | 2008-105437 A | 5/2008 |

* cited by examiner

VEHICLE DOOR STRUCTURE

CROSS-REFERENCE TO RELATED APPLICATIONS

This is a national phase application based on the PCT International Patent Application No. PCT/JP2014/065829 filed Jun. 10, 2014, claiming priority to Japanese Patent Application No. 2013-157736 filed Jul. 30, 2013, the entire contents of both of which are incorporated herein by reference.

TECHNICAL FIELD

The present invention relates to a vehicle door structure.

BACKGROUND ART

There are conventionally known door structures in which, at a vehicle door having a door main body portion that is formed from a door inner panel made of resin and a door outer panel made of resin, a frame that is made of metal is disposed within the door main body portion, and door hinges and a door lock are fastened to this frame while nipping the door inner panel (see, for example, Japanese Patent Application Laid-Open (JP-A) No. S63-46923).
[Patent Document 1]

SUMMARY OF INVENTION

Technical Problem

However, in this door structure, at the time of a side collision of the vehicle, when load that is directed toward the door thickness direction inner side is applied to the frame that is provided within the door main body portion, there is the concern that breaks or cracks will arise at the door inner panel that is nipped at the fastened regions of the door hinges and the door lock. In this way, there is room for improvement in a door structure in which a frame is provided within a door main body portion.

Thus, an object of the present invention is to obtain a vehicle door structure in which breakage of a door inner panel can be suppressed even if load, that is directed toward a door thickness direction inner side, is applied to a frame that is provided within a door main body portion.

Solution to Problem

In order to achieve the above-described object, a vehicle door structure relating to a first aspect of the present invention has: a door inner panel that is made of resin and that, together with a door outer panel, structures a door main body portion having a closed cross-sectional shape; a frame having a frame main body portion, that extends in a door longitudinal direction, and a frame extended portion, that is made of metal and is provided in continuation with a length direction end portion side of the frame main body portion, the frame being disposed within a closed cross-section of the door main body portion; and a bent portion that is bendingly or curvingly molded at the frame extended portion, and that, as seen in plan view, is disposed further toward a door thickness direction outer side or inner side than the frame main body portion.

In accordance with the invention relating to the first aspect, the bent portion, that is disposed further toward the door thickness direction outer side or inner side than the frame main body portion as seen in plan view, is bendingly or curvingly molded at the frame extended portion that is made of metal. Accordingly, at the time of a side collision of the vehicle, even if load, that is directed toward the door thickness direction inner side, is applied to the frame that is provided within the closed cross-section of the door main body portion, due to the bent portion of the frame extended portion being elongated rectilinearly, that load is absorbed efficiently. Accordingly, breakage (the occurrence of breaks or cracks) of the door inner panel is suppressed.

A vehicle door structure relating to a second aspect of the present invention is the vehicle door structure of the first aspect, wherein a joining member that is made of metal is provided at the door inner panel so as to close-off an opening portion formed in the door inner panel, and a free end portion of the frame extended portion is joined to the joining member.

In accordance with the vehicle door structure relating to the second aspect, the joining member that is made of metal is provided so as to close-off the opening portion that is formed in the door inner panel, and the free end portion of the frame extended portion is joined to this joining member. Accordingly, when load, that is directed toward the door thickness direction inner side, is applied to the frame, the bent portion of the frame extended portion is elongated rectilinearly, and the joining member, that is exposed from the opening portion of the door inner panel, deforms. Accordingly, the load, that is directed toward the door thickness direction inner side and that is applied to the frame, is absorbed more efficiently, and breakage (the occurrence of breaks or cracks) of the door inner panel is suppressed more.

A vehicle door structure relating to a third aspect of the present invention is the vehicle door structure of the second aspect, wherein the free end portion of the frame extended portion is joined to the joining member together with a door structural part that is for mechanically connecting the door main body portion to a vehicle main body.

In accordance with the vehicle door structure relating to the third aspect, the free end portion of the frame extended portion is joined to the joining member together with a door structural part that is for mechanically connecting the door main body portion to the vehicle main body. Accordingly, at the time of a side collision of the vehicle or at the time of fitting the door main body portion to the vehicle main body, even if load is applied to the door structural part, the joining member that is exposed from the opening portion deforms, and that load is absorbed. Therefore, the load that is applied to the door inner panel is reduced. Accordingly, breakage (the occurrence of breaks or cracks) of the door inner panel at the region where the door structural part is joined is suppressed.

Further, the joining member that is made of metal is provided at the door inner panel only at the region thereof where the free end portion of the frame extended portion and the door structural part are joined. Therefore, the mass of the door main body portion is reduced efficiently while the support rigidity of the door main body portion with respect to the vehicle main body is ensured.

A vehicle door structure relating to a fourth aspect is the vehicle door structure of any one of the first aspect through the third aspect, wherein the bent portion is formed in a wave shape as seen in plan view.

In accordance with the vehicle door structure relating to the fourth aspect, the bent portion is formed in a wave shape as seen in plan view. Accordingly, when load, that is directed toward the door thickness direction inner side, is applied to the frame, the bent portion is elongated in a rectilinear shape even longer than a case in which the bent portion is not formed in a wave shape as seen in plan view. Accordingly, the load, that is directed toward the door thickness direction inner side and that is applied to the frame, is absorbed more efficiently, and breakage (the occurrence of breaks or cracks) of the door inner panel is suppressed more.

Advantageous Effects of Invention

As described above, in accordance with the vehicle door structure relating to the first aspect of the present invention, even if load, that is directed toward a door thickness direction inner side, is applied to a frame that is provided within a door main body portion, breakage of a door inner panel can be suppressed.

In accordance with the vehicle door structure relating to the second aspect of the present invention, even if even if load, that is directed toward a door thickness direction inner side, is applied to a frame that is provided within a door main body portion, breakage of a door inner panel can be suppressed more.

In accordance with the vehicle door structure relating to the third aspect of the present invention, even if load is applied to a door structural part, breakage of a door inner panel, at the region where the door structural part is joined thereto, can be suppressed.

In accordance with the vehicle door structure relating to the fourth aspect of the present invention, even if load, that is directed toward a door thickness direction inner side, is applied to a frame that is provided within a door main body portion, breakage of a door inner panel can be suppressed more.

DESCRIPTION OF EMBODIMENTS

Embodiments relating to the present invention are described in detail hereinafter on the basis of the drawings. Note that, for convenience of explanation, arrow UP that is shown appropriately in the respective drawings is the door upward direction, arrow FR is the door frontward direction, and arrow OUT is the door thickness direction outer side. Further, in the following description, when vertical, longitudinal and inward/outward directions are used, they mean the vertical of the door vertical direction, the longitudinal of the door longitudinal direction, and the inward/outward of the door thickness direction unless otherwise stated.

<First Embodiment>

Figure 1:
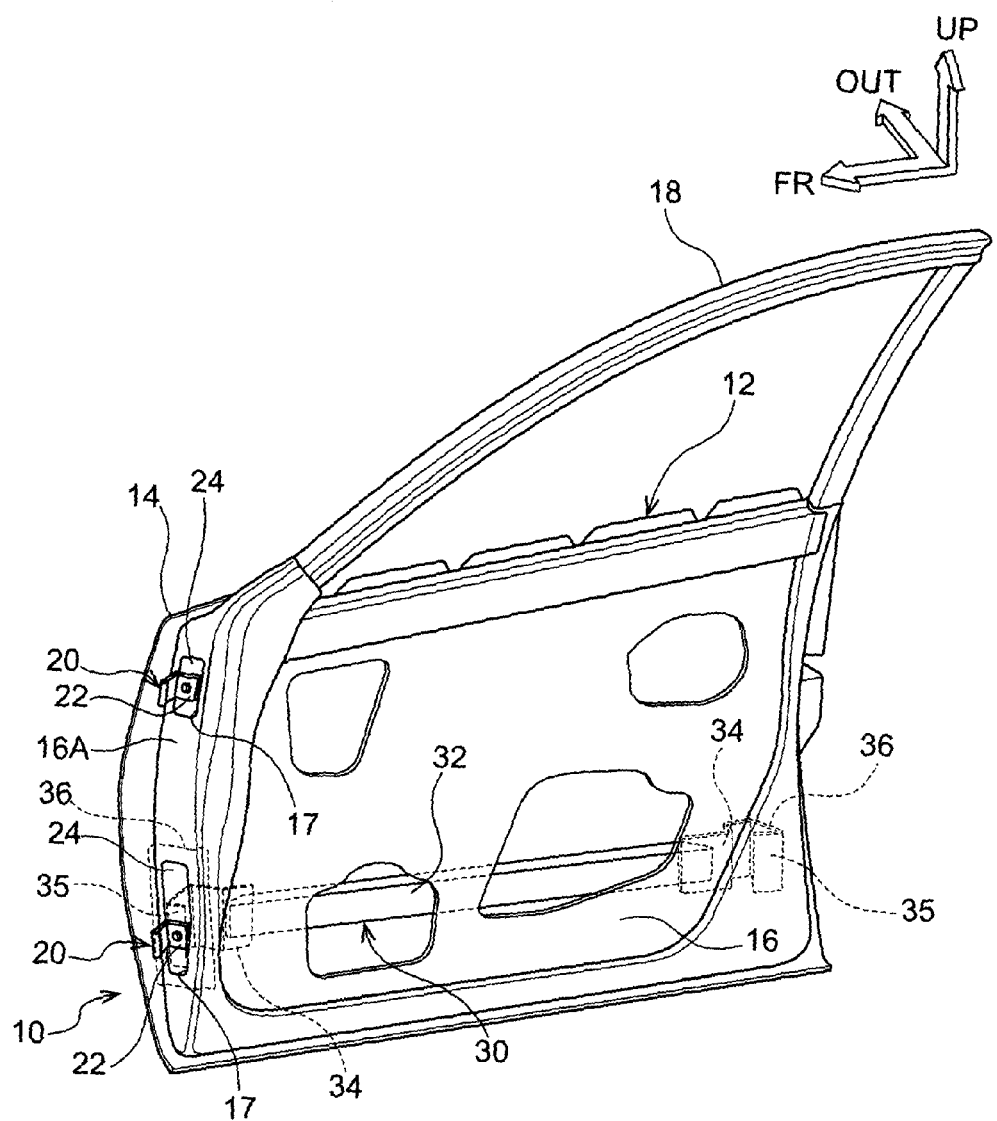
FIG. 1 is a perspective view showing a vehicle door structure relating to a first embodiment.
Figure 2:
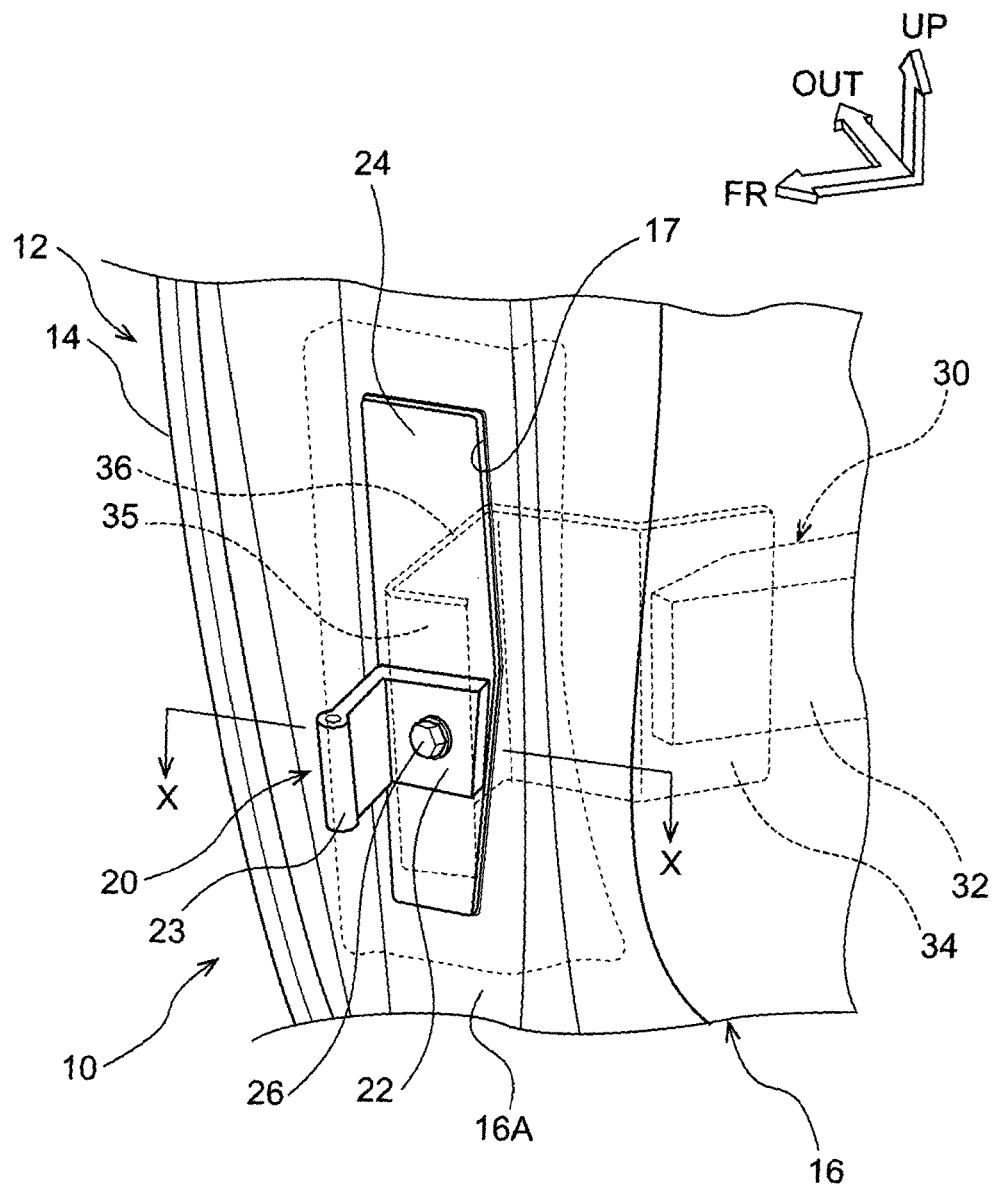
FIG. 2 is a perspective view showing, in an enlarged manner, main portions of the vehicle door structure relating to the first embodiment.
Figure 3:
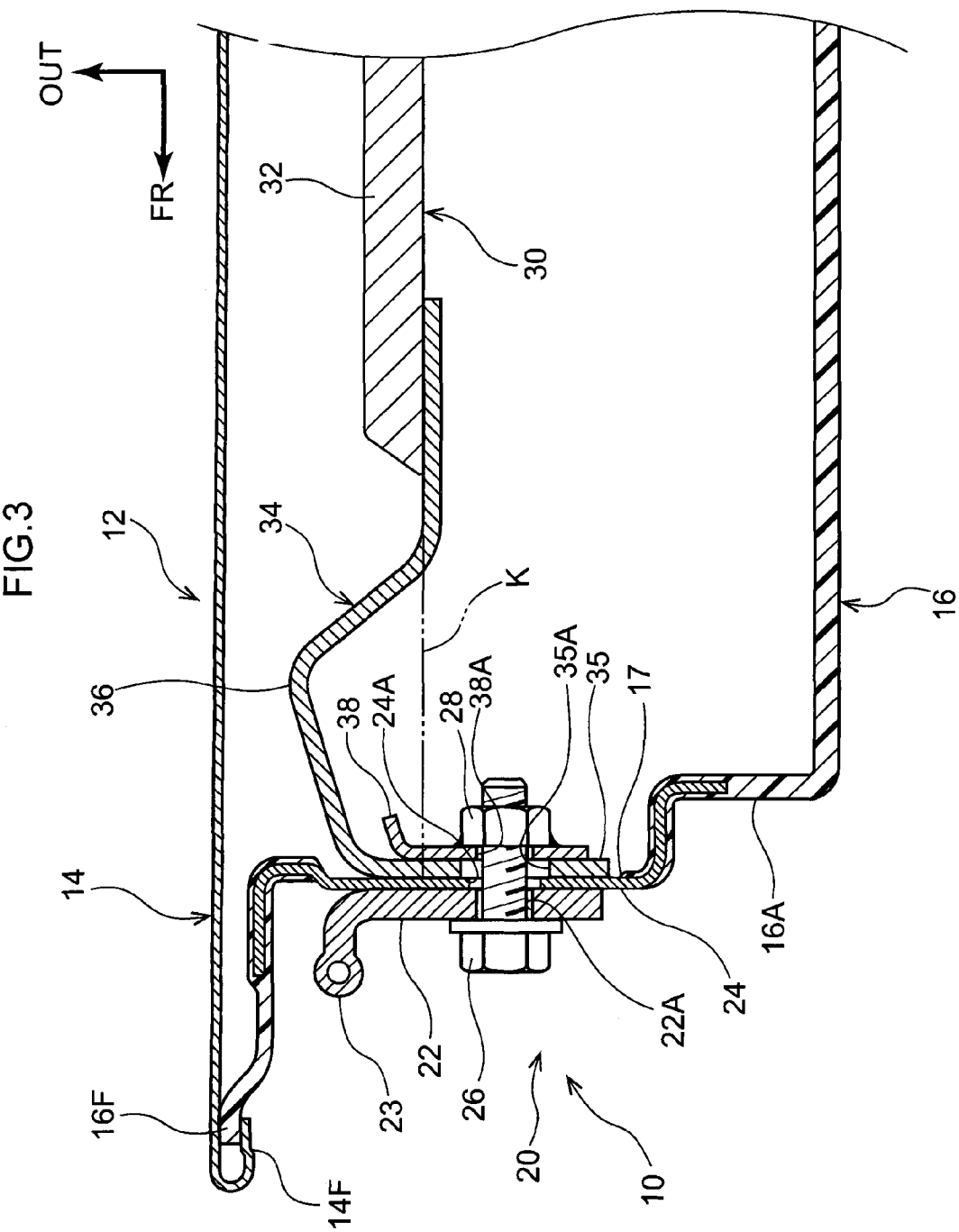
FIG. 3 is a cross-sectional view that is an X-X line view of FIG. 2.

A first embodiment is described first. As shown in FIG. 1 through FIG. 3, a vehicle door structure 10 relating to the first embodiment has a door outer panel 14 that is made of metal and is provided at the door thickness direction outer side, and a door inner panel 16 that is made of a fiber reinforced plastic (made of an FRP), e.g., is made of a carbon fiber reinforced plastic (made of a CRFP), and is provided at the door thickness direction inner side and, together with the door outer panel 14, structures a door main body portion 12 that has a closed cross-sectional shape. Further, a door frame 18, that is made of metal and is formed in a frame shape, is provided at the upper portion of the door inner panel 16.

As shown in FIG. 3, the front portion of the door inner panel 16 is bendingly molded in a substantial "Z" shape as seen in plan view. A front end portion 14F of the door outer panel 14 is joined by hemming processing to a front end portion 16F of the door inner panel 16 that projects-out toward the door front side at the door thickness direction outer side. Note that, in the following description, the wall portion, that faces in the door longitudinal direction at the front portion of the door inner panel 16, is a front wall portion 16A.

As shown in FIG. 1, a pair of upper and lower door hinge portions 20, that are joined to an unillustrated vehicle main body, are provided at the front wall portion 16A of the door inner panel 16. Further, as shown in FIG. 2 as well, the door hinge portion 20 has a hinge main body 22, that is made of metal and is an example of a door structural part for mechanically connecting the door main body portion 12 to the vehicle main body, and a joining member 24, that is described later and to whose front surface side the hinge main body 22 is mounted.

As shown in FIG. 3, the hinge main body 22 is formed in a substantially "L" shape as seen in plan view, and a cylindrical tubular portion 23, whose axial direction is the vertical direction, is integrally continuous with a distal end portion that projects-out toward the door front side. Note that, because the structures of the upper and lower door hinge portions 20, including the hinge main bodies 22, are the same, only the door hinge portion 20 at the lower side is described hereinafter.

As shown in FIG. 1 through FIG. 3, an opening portion 17, that is rectangular and whose length direction is the vertical direction, is formed in the region, that corresponds to the door hinge portion 20, of the door inner panel 16. Further, the joining member 24, that is made of metal (e.g., aluminum) and structures the door hinge portion 20, is mounted by insert molding to the front wall portion 16A of the door inner panel 16 so as to close-off this opening portion 17.

In detail, the joining member 24 is formed in the shape of a plate that is one size larger than the opening portion 17, and the peripheral edge portion of the joining member 24 is embedded integrally within the plate thickness of the front wall portion 16A surrounding the opening portion 17. Therefore, the plate thickness at the front wall portion 16A of the door inner panel 16 is formed to be thicker than the plate thickness of the joining member 24 (see FIG. 3).

Further, the peripheral edge portion of the joining member 24 is bendingly molded so as to match the shape of the front wall portion 16A of the door inner panel 16 as seen in plan view. Namely, the peripheral edge portion at the door thickness direction outer side is bendingly molded so as to project-out toward the door front side, and the peripheral edge portion at the door thickness direction inner side is bendingly molded toward the door rear side, and in continuation therewith, is bendingly molded toward the door thickness direction inner side. Due thereto, the joining strength of the joining member 24 with respect to the door inner panel 16 is improved.

Further, as shown in FIG. 3, a through-hole 24A, that is for fastening the hinge main body 22 by a bolt 26 and a nut 28, is formed in the substantially central portion of the joining member 24 that is exposed from the opening portion 17. A through-hole 22A, that communicates with the through-hole 24A of the joining member 24, is formed also in the hinge main body 22.

Further, an impact beam 30 that serves as a frame is disposed at the lower portion side within the closed cross-section of the door main body portion 12. The impact beam 30 has a beam main body portion (frame main body portion) 32, that is made of metal and extends in the door longitudinal direction, and beam extended portions (frame extended portions) 34 that are made of metal and are provided in continuation with the length direction both end portion sides of the beam main body portion 32.

The beam main body portion 32 is molded integrally in cross-sectional "U" shape that opens toward the door thickness direction outer side. The beam extended portions 34, that are plate-shaped and have bent portions 36 that are described later, are joined integrally to (by welding or by fastening by bolts or the like) and are provided in continuation with the length direction both end portions of the beam main body portion 32. Note that, because the front and rear beam extended portions 34 have substantially symmetrical shapes, in the following description, mainly the beam extended portion at the door hinge portion 20 side is used as an example, and the structure thereof is described.

The beam extended portion 34 is formed so as to, as seen in plan view, be longer than a virtual extended straight line K that extends toward the door front side of the beam main body portion 32 until reaching the joining member 24. Further, at least a portion of the beam extended portion 34 other than a free end portion 35 thereof that is described later, is made to be the bent portion 36 that is bendingly molded so as to be disposed further toward the door thickness direction outer side than the beam main body portion 32 (the virtual extended straight line K).

In detail, the bent portion 36 of the beam extended portion 34 is first bendingly molded from the front end portion side of the beam main body portion 32 toward the door thickness direction outer side, and subsequently, is bendingly molded toward the door front side. Further, the free end portion (the distal end portion further toward the door front side than the bent portion 36) 35, that is continuous from the bent portion 36 of the beam extended portion 34, is bendingly molded toward the door thickness direction inner side and faces in the door longitudinal direction.

Namely, the free end portion 35 of the beam extended portion 34 is disposed at the rear surface side of the joining member 24. Further, a through-hole 35A, that communicates with the through-hole 24A of the joining member 24, is formed in the free end portion 35 of this beam extended portion 34.

Moreover, a retainer 38 made of metal is disposed at the rear surface side of the free end portion 35 of the beam extended portion 34. Further, a through-hole 38A, that communicates with the through-hole 24A of the joining member 24 and the through-hole 35A of the free end portion 35, is formed in this retainer 38. Accordingly, the free end portion 35 of the beam extended portion 34 is, together with the hinge main body 22, fastened and fixed to the joining member 24 as follows.

First, the hinge main body 22 is disposed at the front surface side of the joining member 24, and the free end portion 35 of the beam extended portion 34 is disposed at the rear surface side of the joining member 24. Then, the bolt 26 is inserted-through the through-hole 22A, the through-hole 24A, the through-hole 35A, the through-hole 38A from the door front side, and is screwed-together with the nut 28 that is provided at the rear surface side of the retainer 38. Due thereto, the hinge main body 22 and the free end portion 35 of the beam extended portion 34 are both fastened and fixed to the joining member 24.

Note that the nut 28 is made to be a weld nut that is fixed to the rear surface side of the retainer 38 coaxially with the through-hole 38A, but is not limited to this. Further, the bent portion 36 is not limited to being formed the bent shape that is illustrated and may be formed, for example, in a curved shape (not illustrated) that is curved in a substantial circular arc shape as seen in plan view, or the like.

Figure 4:
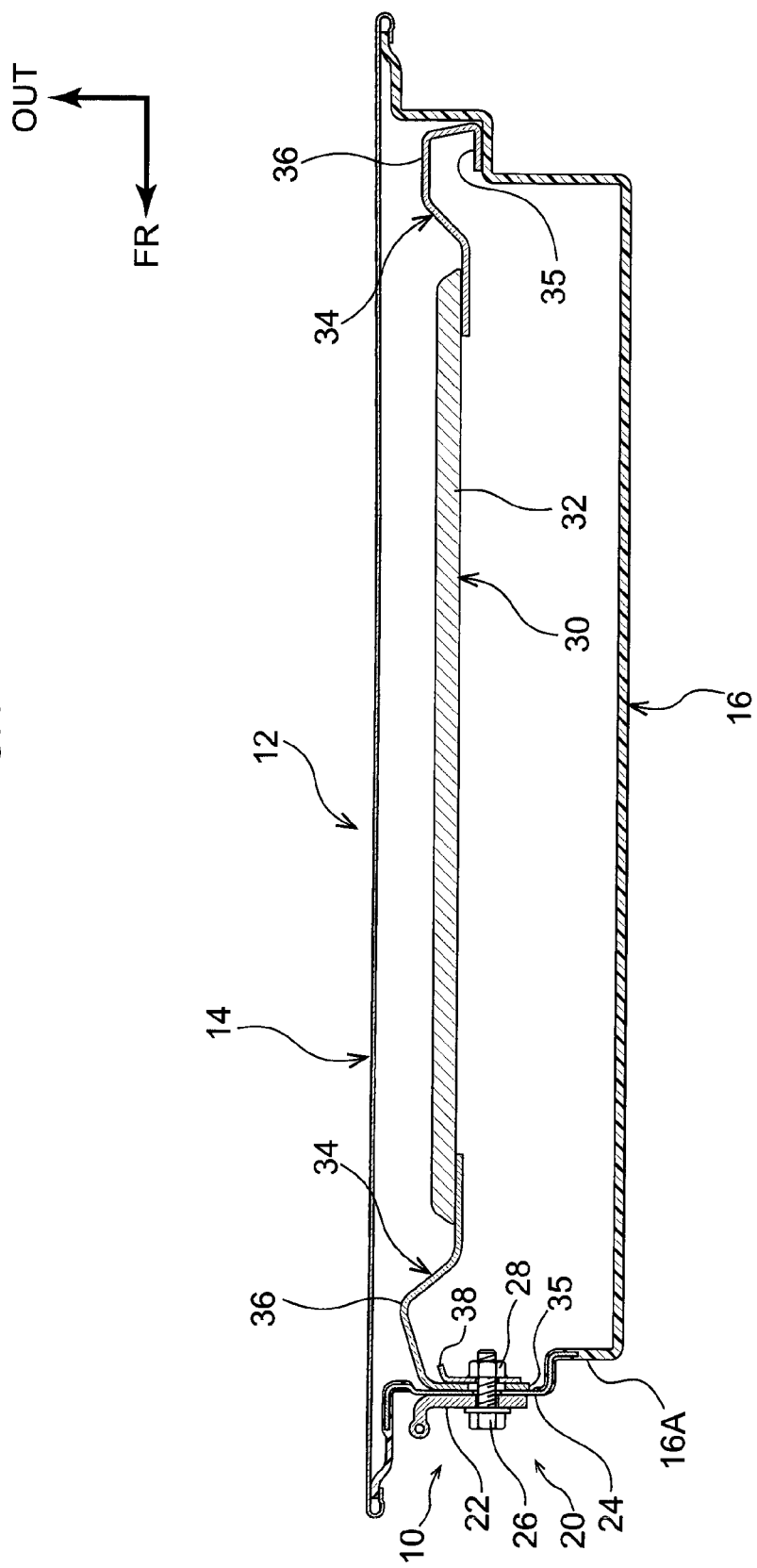
FIG. 4 is a cross-sectional view showing the state of an impact beam before a side collision of the vehicle door structure relating to the first embodiment.

As shown in FIG. 4, the free end portion 35 of the beam extended portion 34 at the rear side is joined, by joining means such as an adhesive or an unillustrated bolt/nut or the like, to the door inner panel 16 or to a joining member that is made of metal and is provided so as to close-off an unillustrated opening portion.

As shown in FIG. 3, the inner diameter of the through-hole 35A, that is formed in the free end portion 35 of the beam extended portion 34, is formed to be larger than the inner diameter of the through-hole 22A formed in the hinge main body 22 and the inner diameter of the through-hole 38A formed in the retainer 38. Due thereto, dispersion in the position of the beam extended portion 34 (the free end portion 35) with respect to the position at which the impact beam 30 is disposed is absorbed.

Operation of the vehicle door structure 10, that relates to the first embodiment and is structured as described above, is described next.

As shown in FIG. 4, the impact beam 30, that is disposed within the closed cross-section of the door main body portion 12, has the beam extended portions 34 at both the front and rear sides of the beam main body portion 32. As seen in plan view, the bent portion 36, that is disposed further toward the door thickness direction outer side than the beam main body portion 32, is bendingly molded at the beam extended portion 34 except for the free end portion 35 that is fastened and fixed (joined) to the joining member 24 (the door inner panel 16).

Figure 5:
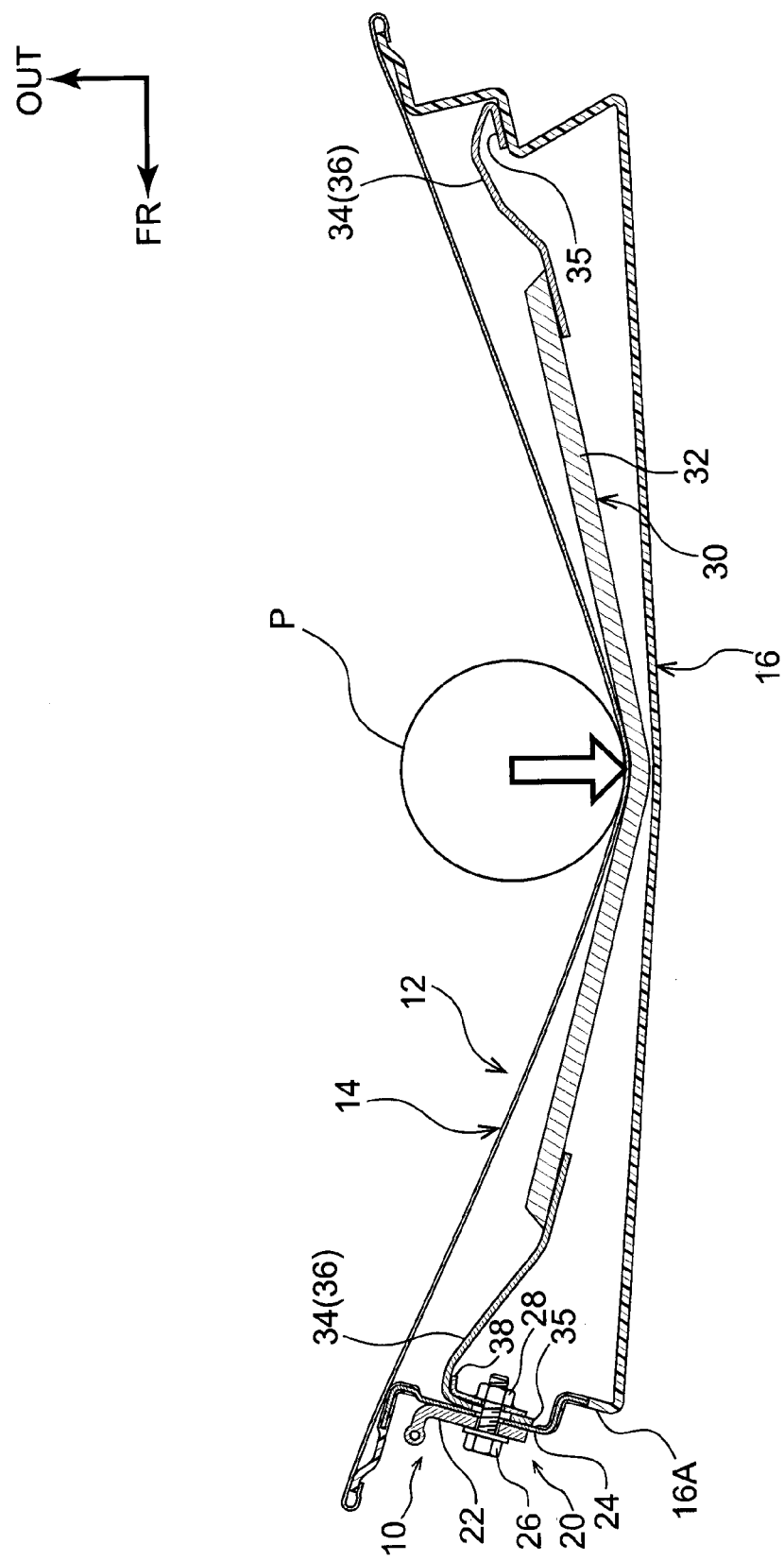
FIG. 5 is a cross-sectional view showing the state of the impact beam after a side collision of the vehicle door structure relating to the first embodiment.

Accordingly, as shown in FIG. 5, when the vehicle is involved in a side collision with an obstacle such as pole P or the like and collision load, that is directed toward the door thickness direction inner side, is inputted to the door main body portion 12, and in more detail, to the beam main body portion 32 of the impact beam 30 via the door outer panel 14, together with the plastic deformation (bending deformation) of the beam main body portion 32, the bent portions 36 of the respective beam extended portions 34 plastically deform so as to elongate in rectilinear shapes, and the inputted collision load is absorbed efficiently.

Accordingly, at the time of a side collision of the vehicle, breakage of the front wall portion 16A of the door inner panel 16, and in more detail, breakage (the generation of breaks or cracks) of the front wall portion 16A surrounding the opening portion 17 where the peripheral edge portion of the joining member 24 is embedded, can be suppressed or prevented.

Further, in this way, the opening portion 17 is formed in the front wall portion 16A of the door inner panel 16, and the joining member 24 is provided so as to close-off this opening portion 17. Further, the free end portion 35 of the beam extended portion 34 is fastened and fixed to the joining member 24 that is exposed from the opening portion 17.

Accordingly, the collision load, that is inputted to the impact beam 30 (the door main body portion 12), can be absorbed also by the plastic deformation (bending deformation) of the joining member 24 that is exposed from the opening portion 17. Accordingly, breakage of the front wall portion 16A surrounding the opening portion 17 can be suppressed or prevented further.

Further, of course at times of a side collision of the vehicle, and also at times when load is applied to the hinge main body 22 such as when the door main body portion 12 is being fit to the vehicle main body or the like, the joining member 24 that is exposed from the opening portion 17 plastically deforms (bendingly deforms), and that load can be absorbed. Accordingly, in this case as well, load that is applied to the front wall portion 16A surrounding the opening portion 17 can be reduced, and breakage of the front wall portion 16A surrounding the opening portion 17 can be suppressed or prevented.

Further, at the door inner panel 16, the joining member 24 that is made of metal is provided only at the region where a door structural part (the hinge main body 22), that is for mechanically connecting the door main body portion 12 to the vehicle main body, is mounted. Accordingly, a decrease in the fastening force of the bolt 26 and the nut 28 due to the passage of time can be suppressed, and the support rigidity of the door main body portion 12 (the door hinge portion 20) with respect to the vehicle main body can be ensured, and the mass of the door main body portion 12 can be reduced efficiently.

<Second Embodiment>

A second embodiment is described next. Note that regions that are equivalent to those of the above-described first embodiment are denoted by the same reference numerals, and detailed description thereof (including common operation) is omitted as appropriate.

Figure 6:
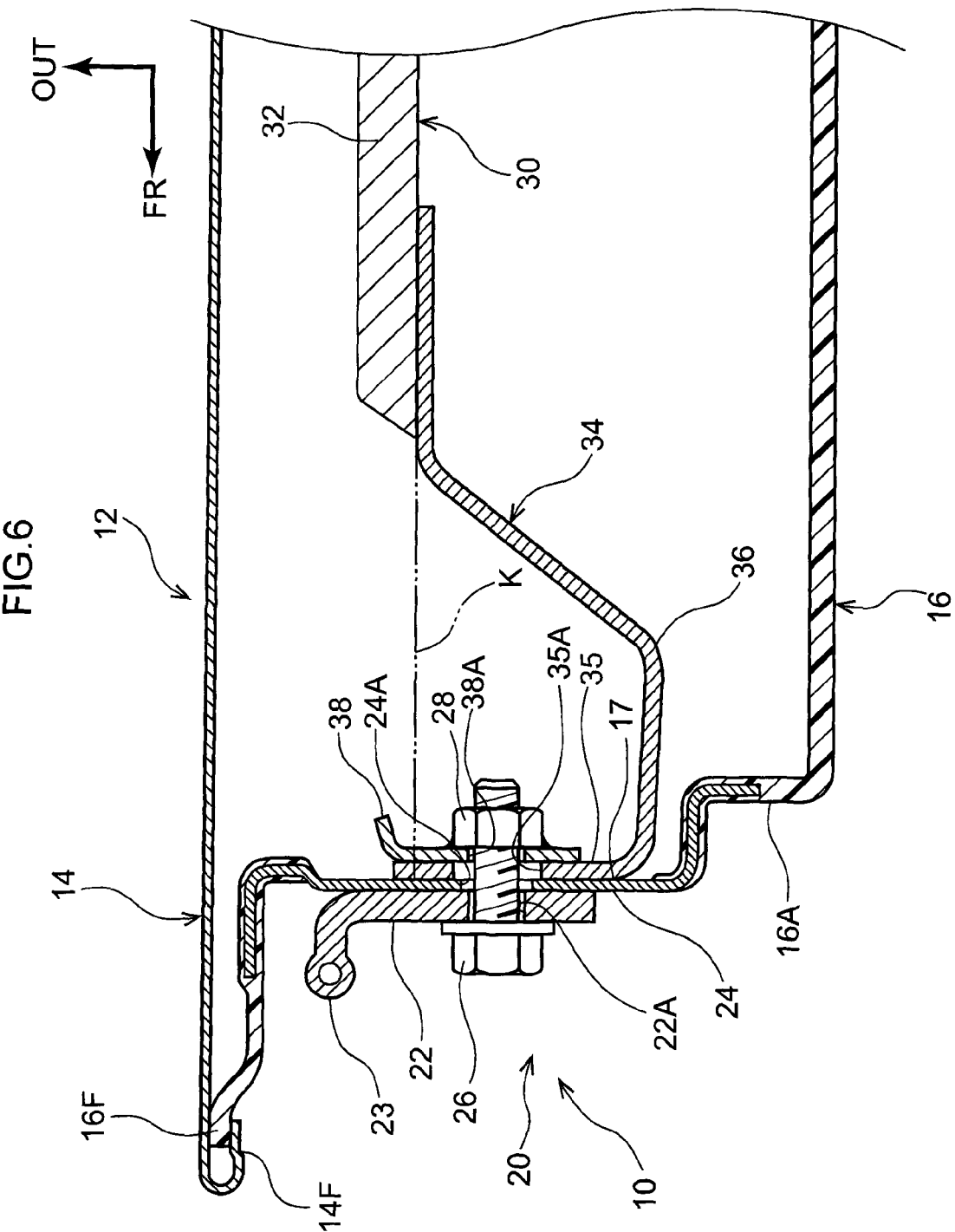
FIG. 6 is a cross-sectional view showing, in an enlarged manner, main portions of a vehicle door structure relating to a second embodiment.

As shown in FIG. 6, in a vehicle door structure 10 relating to the second embodiment, at least a portion of the beam extended portion 34, other than the free end portion 35, is made to be a bent portion 36-2 that is bendingly molded so as to be disposed further toward the door thickness direction inner side than the beam main body portion 32 (the virtual extended straight line K), as seen in plan view. In detail, this beam extended portion 34 also is formed so as to, as seen in plan view, be longer than the virtual extended straight line K that extends toward the door front side of the beam main body portion 32 until reaching the joining member 24.

Further, the bent portion 36-2 of the beam extended portion 34 is first bendingly molded from the front end portion side of the beam main body portion 32 toward the door thickness direction inner side, and subsequently, is bendingly molded toward the door front side. Further, the free end portion 35 of the beam extended portion 34 is further bendingly molded toward the door thickness direction outer side and is disposed at the rear surface side of the joining member 24.

Also at the beam extended portion 34 of the second embodiment that has such a structure, operation and effects that are equivalent to those of the above-described first embodiment are obtained. Note that, in plan view, the bent portions 36-2 of the beam extended portions 34 at both front and rear sides may be structured so as to be disposed further toward the door thickness direction inner side than the beam main body portion 32. Or, there may be a structure in which the bent portion 36-2 of the beam extended portion 34 at either one of the front or rear side is disposed further toward the door thickness direction inner side than the beam main body portion 32, and the bent portion 36-2 of the beam extended portion 34 at the other one of the front or rear side is disposed further toward the door thickness direction outer side than the beam main body portion 32.

<Third Embodiment>

A third embodiment is described next. Note that regions that are equivalent to those of the above-described first embodiment and second embodiment are denoted by the same reference numerals, and detailed description thereof (including common operation) is omitted as appropriate.

Figure 7:
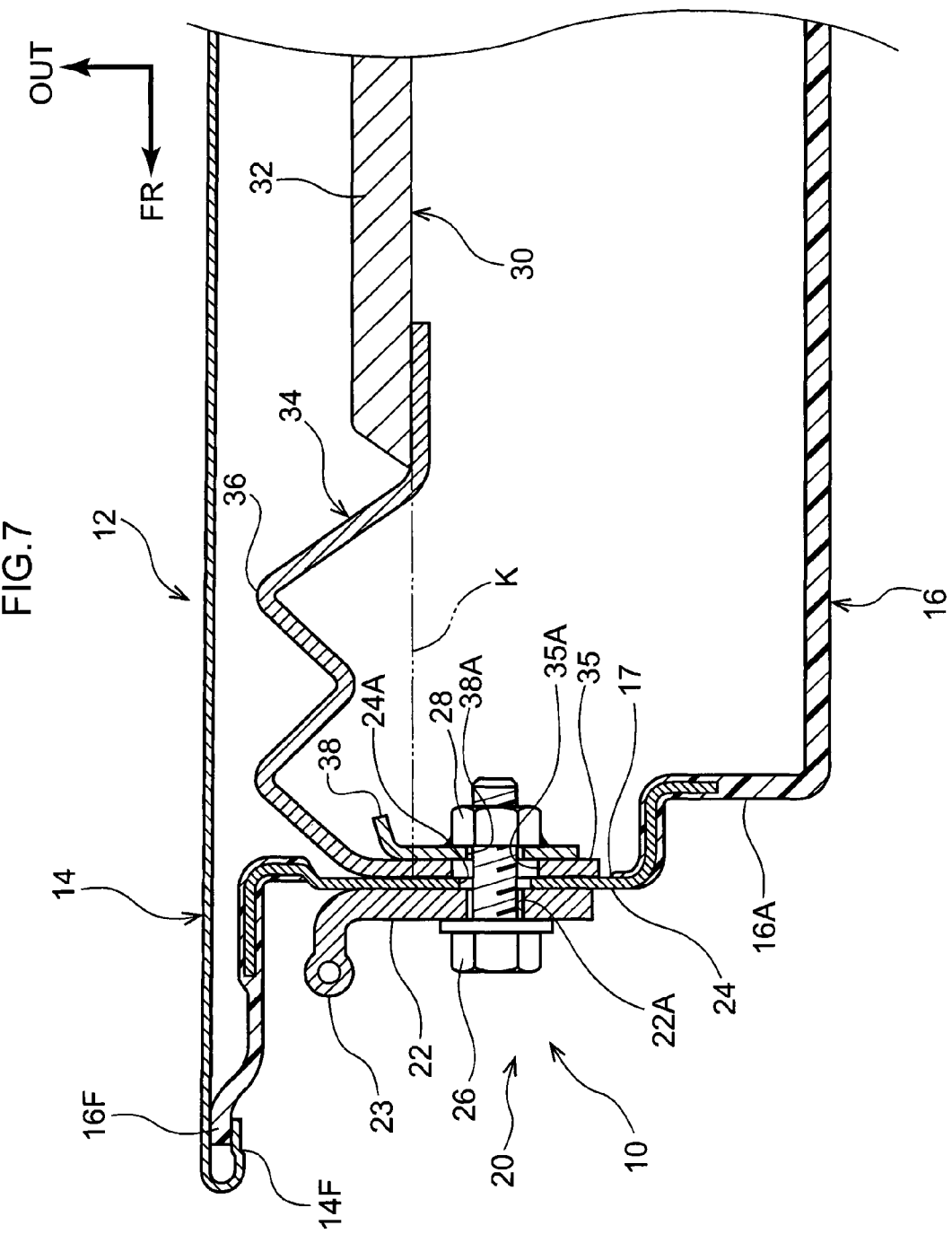
FIG. 7 is a cross-sectional view showing, in an enlarged manner, main portions of a vehicle door structure relating to a third embodiment.

As shown in FIG. 7, in a vehicle door structure 10 relating to the third embodiment, at least a portion of the beam extended portion 34, other than the free end portion 35, is made to be a bent portion 36-3 that is bendingly molded so as to be disposed further toward the door thickness direction outer side than the beam main body portion 32 (the virtual extended straight line K) as seen in plan view, and this bent portion 36-3 is formed in a wave shape as seen in plan view. In detail, this beam extended portion 34 also is formed so as to, as seen in plan view, be longer than the virtual extended straight line K that extends toward the door front side of the beam main body portion 32 until reaching the joining member 24.

Further, the bent portion 36-3 of the beam extended portion 34 is first bendingly molded from the front end portion side of the beam main body portion 32 toward the door thickness direction outer side, and subsequently (further toward the door thickness direction outer side than the virtual extended straight line K), is bendingly deformed in a wave-shape in the order of toward the door thickness direction inner side, the door thickness direction outer side, the door thickness direction inner side. Further, the free end portion 35 of the beam extended portion 34 is further bendingly molded toward the door thickness direction inner side and is disposed at the rear surface side of the joining member 24.

At the beam extended portion 34 of the third embodiment that has such a structure, when collision load, that is directed toward the door thickness direction inner side, is inputted to the beam main body portion 32, the bent portion 36 can plastically deform so as to elongate in an even longer rectilinear shape than the beam extended portions 34 of the above-described first embodiment and second embodiment. Accordingly, the collision load that is inputted to the impact beam 30 (the door main body portion 12) can be absorbed even more efficiently. Note that the wave-shape of the bent portion 36-3 in the third embodiment may be formed at the bent portion 36-2 in the second embodiment.

The vehicle door structure 10 relating to the present embodiments has been described above on the basis of the drawings, but the vehicle door structure 10 relating to the present embodiments is not limited to the illustrated structures, and the design thereof can be changed appropriately within a scope that does not deviate from the gist of the present invention. For example, the impact beam 30 may be structured so as to span between the door hinge portion 20 at the upper side and an unillustrated door lock portion (a joining member that is made of metal and to which an unillustrated lock main body is joined).

Namely, the door structural part relating to the present embodiments is not limited to the hinge main body 22. Further, the free end portion 35 of the beam extended portion 34 is not limited to a structure of being fastened, together with the door structural part (the hinge main body 22), to the joining member 24. Namely, the free end portion 35 of the beam extended portion 34 may be structured so as to be joined to the joining member 24 or the door inner panel 16, independently of the door structural part (the hinge main body 22).

Further, the beam extended portion 34 is not limited to a structure that is joined integrally with and provided continuously with the beam main body portion 32, and may be structured so as to be molded integrally with and provided continuously with the beam main body portion 32. Moreover, there may be a structure in which the beam extended portion 34 (the bent portion 36) is provided only at either one of the front or rear sides. Further, the number of wave-shapes that form the bent portion 36 of the beam extended portion 34 also is not limited to that of the illustrated structure.

Further, the beam main body portion 32 is not limited to being formed in a cross-sectional "U" shape that opens toward the door thickness direction outer side, and, for example, may be formed in a cross-sectional "U" shape that opens toward the door thickness direction inner side, or a cross-sectional "U" shape that opens toward the door upward direction or the door downward direction, or, moreover, in a (hollow) pipe shape or the like.

Further, the joining member 24 is not limited to a structure that is provided at the door inner panel 16 by insert molding, and may be structured so as to be provided by joining means such as an unillustrated nut/bolt or an adhesive or the like. Moreover, the joining member 24 does not have to be made of metal, and, there may be a structure in which the joining member 24 is not provided.

The disclosure of Japanese Patent Application No. 2013-157736 is, in its entirety, incorporated by reference into the present Description. All publications, patent applications, and technical standards mentioned in the present Description are incorporated by reference into the present Description to the same extent as if such individual publication, patent application, or technical standard was specifically and individually indicated to be incorporated by reference.

The invention claimed is:

1. A vehicle door structure comprising:
   a door inner panel that is made of resin and that, together with a door outer panel, structures a door main body portion having a closed cross-sectional shape;
   a frame having a frame main body portion, that extends in a door longitudinal direction, and a frame extended portion, that is made of metal and is provided in continuation with a length direction end portion side of the frame main body portion, the frame being disposed within a closed cross-section of the door main body portion; and
   a bent portion of the frame extended portion that is first bendingly or curvingly molded from the end portion side of the frame main body portion toward either a door thickness direction outer side or inner side, and
   is second bendingly or curvingly molded toward a door front side at a location disposed further toward the door thickness direction outer side or inner side than the frame main body portion; wherein:
   a joining member that is made of metal is provided at the door inner panel so as to close-off an opening portion formed in the door inner panel, and
   a free end portion of the frame extended portion is joined to the joining member.

2. The vehicle door structure of claim 1, wherein the free end portion of the frame extended portion is joined to the joining member together with a door structural part that is for mechanically connecting the door main body portion to a vehicle main body.

3. The vehicle door structure of claim 1, wherein the bent portion is formed in a wave shape.

* * * * *